(12) United States Patent
Proctor, Jr.

(10) Patent No.: US 8,842,642 B2
(45) Date of Patent: Sep. 23, 2014

(54) TRANSMITTING ACKNOWLEDGEMENT MESSAGES USING A STAGGERED UPLINK TIME SLOT

(75) Inventor: James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 27 days.

(21) Appl. No.: 13/312,257

(22) Filed: Dec. 6, 2011

(65) Prior Publication Data

US 2012/0076113 A1 Mar. 29, 2012

Related U.S. Application Data

(63) Continuation of application No. 12/246,190, filed on Oct. 6, 2008, now Pat. No. 8,072,944, which is a continuation of application No. 09/691,874, filed on Oct. 19, 2000, now Pat. No. 7,433,340.

(51) Int. Cl.
*H04B 7/216* (2006.01)
*H04W 72/12* (2009.01)
*H04W 72/04* (2009.01)

(52) U.S. Cl.
CPC ...... *H04W 72/1257* (2013.01); *H04W 72/0446* (2013.01)
USPC .......................................... 370/335

(58) Field of Classification Search
CPC ... H04W 24/00; H04L 43/50; H04L 43/0852; H04L 43/08; H04B 17/003
USPC ................... 370/335, 310, 342, 464
See application file for complete search history.

(56) References Cited

U.S. PATENT DOCUMENTS

| | | | |
|---|---|---|---|
| 4,675,863 A | 6/1987 | Paneth et al. | |
| 4,817,089 A | 3/1989 | Paneth et al. | |
| 4,862,453 A | 8/1989 | West et al. | |
| 4,866,709 A | 9/1989 | West et al. | |
| 5,022,024 A | 6/1991 | Paneth et al. | |
| 5,027,348 A | 6/1991 | Curry, Jr. | |
| 5,687,194 A | 11/1997 | Paneth et al. | |
| 5,852,604 A | 12/1998 | Cooley et al. | |
| 5,930,297 A | 7/1999 | Kaewell, Jr. et al. | |
| 5,966,378 A * | 10/1999 | Hamalainen | 370/348 |
| 5,974,039 A | 10/1999 | Schilling | |
| 6,069,886 A | 5/2000 | Ayerst et al. | |
| 6,075,792 A | 6/2000 | Ozluturk | |
| 6,101,177 A * | 8/2000 | Bodin et al. | 370/336 |
| 6,226,274 B1 | 5/2001 | Reese et al. | |
| 6,671,260 B1 | 12/2003 | Engstrand | |
| 6,788,689 B1 | 9/2004 | Turner et al. | |
| 6,804,252 B1 | 10/2004 | Johnson | |
| 7,068,676 B1 * | 6/2006 | Sugaya et al. | 370/445 |
| 7,106,781 B2 | 9/2006 | Agee et al. | |
| 7,848,282 B2 | 12/2010 | Padovani et al. | |
| 2001/0046219 A1 | 11/2001 | Kitade et al. | |

\* cited by examiner

*Primary Examiner* — Andrew Lai
*Assistant Examiner* — Zhiren Qin
(74) *Attorney, Agent, or Firm* — Volpe and Koenig, P.C.

(57) ABSTRACT

A downlink communication is transmitted/received in at least one downlink time slot. In response to the received downlink communication, an acknowledgement message is received/transmitted in an uplink time slot a fixed integer number of uplink time slots after transmission/reception of the received downlink communication. The uplink and downlink time slots are staggered by substantially a half of a time slot.

12 Claims, 5 Drawing Sheets

TRANSMITTING ACKNOWLEDGEMENT MESSAGES USING A STAGGERED UPLINK TIME SLOT

CROSS REFERENCE TO RELATED APPLICATIONS

This application is a continuation of U.S. patent application Ser. No. 12/246,190 filed Oct. 6, 2008 which is a continuation of U.S. patent application Ser. No. 09/691,874 filed Oct. 19, 2000, which issued as U.S. Pat. No. 7,433,340 on Oct. 7, 2008, which are incorporated by reference as if fully set forth.

BACKGROUND

In a wireless telecommunication system, radio channels provide a physical link between communication units. The wireless communication units in such a system typically include a base station processor in communication with a network such as the Public Switchboard Telephone Network (PSTN), in the case of voice communication, or a data network, in the case of data communication, and one or more subscriber access units in communication with a plurality of end user computing devices, such as user PCs. The wireless channels include forward channels, for message transmission from the base station processor to the subscriber access units, and reverse channels, for message transmission to the base station processor from the subscriber access units.

In the case of a wireless data system such as may be used to provide wireless Internet access, each base station processor typically serves many subscriber access units, which in turn serve many end user computing devices. The wireless channels, however, are a scarce resource, and are therefore allocated by a scheduler among the subscriber access units served by the base station processor. The scheduler allocates the wireless channels among the subscriber access units on a traffic demand basis. One way of supporting on demand access among multiple users is so-called time division multiple access (TDMA) whereas each of the wireless channels are allocated to specific connections only for a certain predetermined time intervals or time slot. Message transmission is initiated at the beginning of each time slot. A message queued for transmission via a wireless channel, therefore, remains queued until the beginning of the next time slot. The rate and duration of the time slots, therefore, define a message transmission cycle.

Often, a message transmission results in a return message being transmitted back to the sending wireless communication unit. Frequently, the return message is computed and queued for transmission in less than the predetermined interval defining the time slots. The return message may even be computed and enqueued in less than one half the duration of a time slot. However, the return message must still wait enqueued until the next allocated time slot becomes available to the particular connection. Therefore, transmission of the message and the return message requires at least three time slots: one to transmit the message, a second during which the return message is computed, and a third to transmit the return message, even if the return message was computed well before the second time slot completed.

Further, some channel allocation methods allocate a wireless channel for the return message at the same time as allocating a channel for the initial message which triggered the return message. The wireless channel allocated for the return message, therefore, remains allocated until the return message is received.

It would be beneficial, therefore, to provide a system and method for scheduling the time slots such that the forward cycle and the reverse cycle are out of phase, therefore providing a time slot for a return message in less than a full time slot interval.

SUMMARY OF THE INVENTION

An apparatus and method for staggering forward and reverse channel time slot allocation in a wireless communication network allows a wireless communication unit, such as a base station processor or a subscriber access unit, to transmit a return message in less than a full time slot interval. Forward and reverse channel allocation occurs as a cycle of time slots occurring at periodic timing intervals. Transmission of a wireless frame carrying a message payload occurs at the beginning of the time slot. Since the forward and reverse channel allocation cycles need not be concurrent, or in phase, these cycles are staggered with respect to each other. By staggering the forward and reverse channel allocation timing interval, the return message is sent after only a portion of a full timing interval, rather than being delayed up to one complete timing interval.

A set of forward channels and a set of reverse channels are designated to transmit wireless messages between a subscriber access unit and a base station processor. The message transmission cycle for the forward channel and for the reverse channels do not need to be concurrent. A forward cycle determines the time slots for the forward channel and a reverse cycle determines the time slots for the reverse channel.

A message sent often results in a return message in the opposite direction. A message sent via a forward channel may result in a return message via a reverse channel. Similarly, a message sent via a reverse channel may result in a return message being sent via a forward channel. Many return messages, however, do not require a full timing interval to compute. By staggering, or offsetting, the forward and reverse channel allocation cycles, the time slots will be staggered, or overlap, rather than occurring in concurrent cycles. Return messages need to wait only for the timing interval represented by the overlap. Therefore, return messages can be sent more quickly than if a full time slot duration was to elapse. In this manner, a return message which requires only a portion of a timing interval to compute need only wait for a portion of a full timing interval until a wireless channel is available to transmit the return message.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
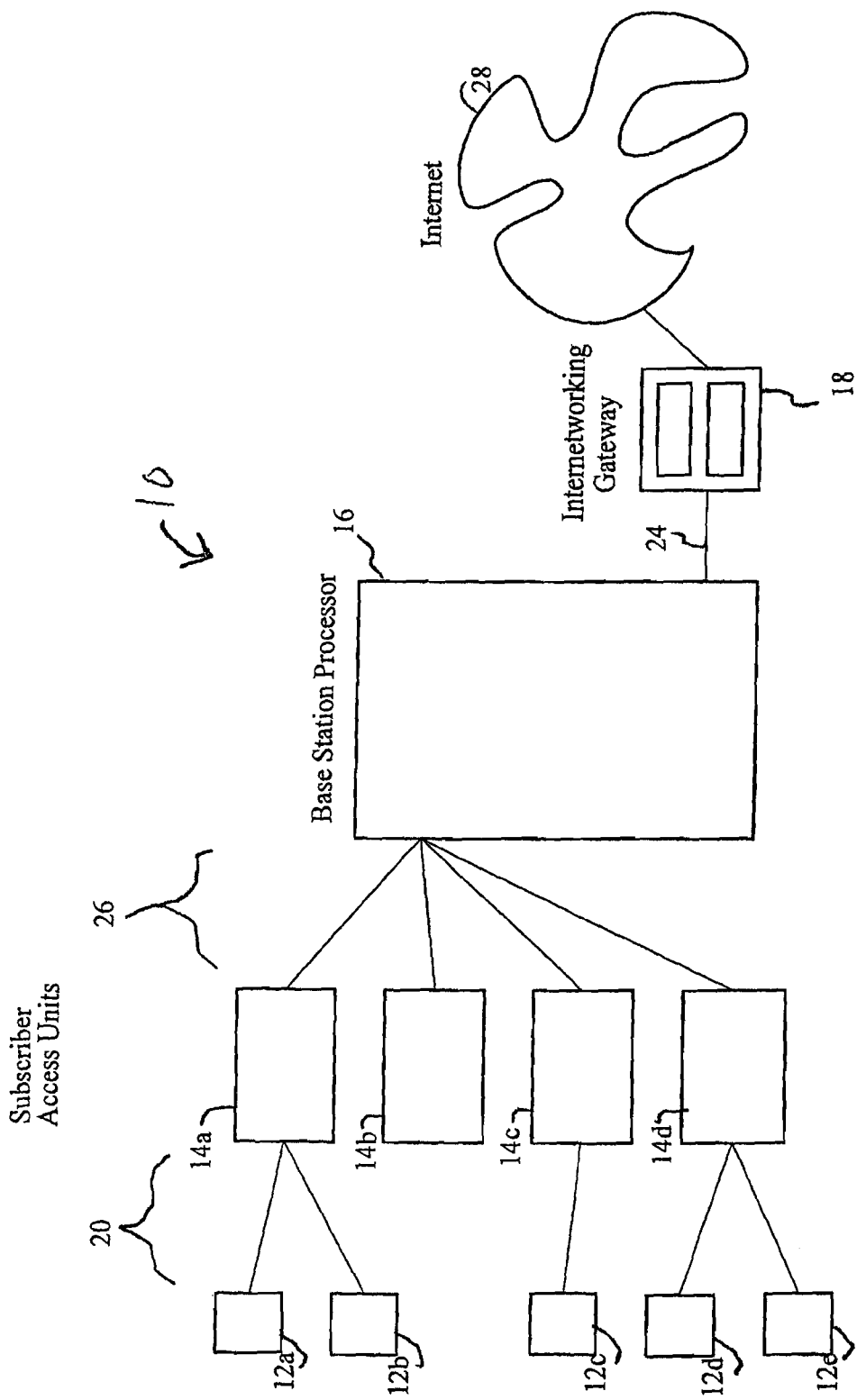
FIG. 1 shows a block diagram of a wireless communication system suitable for performing wireless channel allocation as defined herein.

FIG. 1 shows a wireless telecommunications system suitable for performing staggered forward and reverse channel allocation. A plurality of user PCs 12*a*-12*e* are each in communication with a subscriber access unit (SAU) 14*a*-*d* via a wired connection 20. The wired connection typically conforms to a wired protocol such as TCP/IP or UDP/IP.

The subscriber access units 14*a*-14*d* are in wireless communication with a base station processor (13SP) 16 via a wireless link 26. The wireless link 26 conforms to a wireless protocol such as IS 95 or another wireless protocol which supports communication via an RF medium. The base station processor 16 is also connected to a public access network 18 such as the Internet, via an internetworking gateway 24. The internetworking gateway is typically a bridge, router, or other connection to a network backbone, and may be provided by a remote provider such as an Internet Services Provider (ISP). In this manner, an end user at the user PC 12 is provided a wireless connection to a public access network 18 via the subscriber access unit 14 and the base station processor 16.

Typically, a user PC 12 sends a message over a wired link 20, such as a local area network or bus connection, to the subscriber access unit 14. The subscriber access unit sends a message via the wireless link 26 to the base station processor 16. The base station processor 16 sends the message to the public access network 28 via the internetworking gateway 18 for delivery to a remote node 30 located on the network 28. Similarly, a remote node 30 located on the network can send a message to the user PC by sending it to the base station processor 16 via the internetworking gateway 24. The base station processor 16 sends the message to the subscriber access unit serving the user PC 12 via the wireless link 26. The subscriber access unit sends the message to the user PC 14 via the wired link 20. The subscriber access unit 14 and the base station processor 16 can therefore be viewed as endpoints of the wireless link 26.

As indicated above, there are typically many more user PCs than there are available wireless channel resources. For this reason, the wireless channels are allocated according to some type of demand-based multiple access technique to make maximum use of the available radio channels. Multiple access is often provided in the physical layer, such as by Frequency Division Multiple Access (FDMA) or by schemes that manipulate the radio frequency signal such as Time Division Multiple Access (TDMA) or Code Division Multiple Access (CDMA). In any event, the nature of the radio spectrum is such that it is a medium that is expected to be shared. This is quite dissimilar to the traditional environment for data transmission, in which a wired medium such as a telephone line or network cabling is relatively inexpensive to obtain and to keep open all the time.

In a typical wireless transmission, a message send often results in a return message. A wireless channel is allocated to send the message, and a second wireless channel allocated in the opposite direction to send the return message. Wireless channel allocation can occur by a variety of methods, such as that disclosed in U.S. patent application Ser. No. 09/574,622, filed May 19, 2000, entitled "Automatic Reverse Channel Assignment in a Two-Way TDM Communication System," which issued into U.S. Pat. No. 6,804,252 on Oct. 12, 2004, which is incorporated herein by reference.

Figure 2:
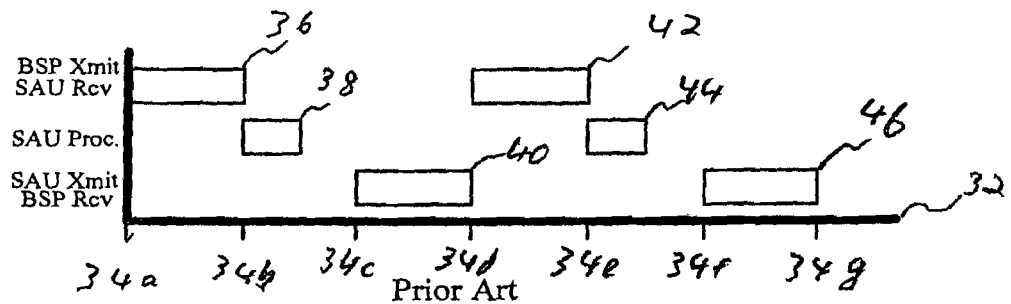
FIG. 2 shows a prior art timing chart depicting transmission of a message and a return message.
Figure 3:
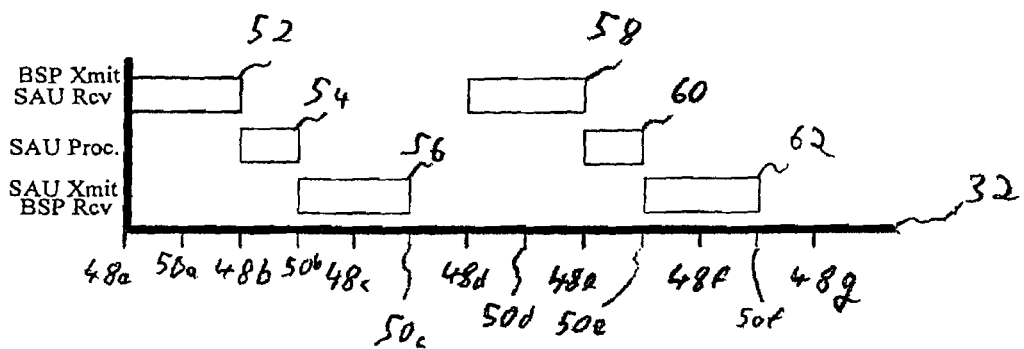
FIG. 3 shows a timing chart depiction transmission of a message and a return message as defined herein.

FIG. 2 illustrates a prior art message send and a return message send. Referring to FIGS. 2 and 3, time is shown along the horizontal axis 32. Wireless message transmission occurs at regular intervals as defined by the channel allocation cycle. Each time slot in the channel allocation cycle is shown by increments 34*a*-34*g*. During the time slot beginning at 34*a*, a message is sent from the base station processor 16 to the subscriber access unit 14, shown by time block 36. During the next time slot beginning at 34*b*, the subscriber access unit 14 processes the message and enqueues a return message, as shown by time block 38. Although the time to process and enqueue the return message required only half of a full time slot interval, it remained enqueued until the beginning of the next time slot since the wireless transmission occurs at the beginning of each time slot. The return message is sent back to the base station processor 16 during the time slot beginning at 34*c*, and received by the base station processor at 34*d*. A similar sequence occurs for the next message sent, as shown by time blocks 42, 44, and 46. Each message sent has required three time slot intervals before the return message is received.

In a particular embodiment, the time slot intervals are approximately 26 ms, due to the wireless protocol employed. These intervals are actually 26.666 ms in duration, and are called an epoch. In this embodiment, as in the timing diagram of FIG. 3, the timeslot intervals are staggered by one-half, or approximately 13 ms. In another embodiment, the time slots could be staggered by other amounts. Factors affecting the selection of the staggering amount include the volume of message traffic, availability of channels at the base station processor 16 and the subscriber access units 14, and the likelihood of processing and enqueueing the return message before the beginning of the next time slot. For example, if the return messages in one direction were typically processed and enqueued in 16 ms and the return messages were typically processed and enqueued in the opposite direction in 10 ms, it would be beneficial to have the cycle corresponding to the 16 ms processing time lead the opposite cycle by 10 ms. In this manner, a new time slot would occur 16 ms. after the previous message was received.

FIG. 3 illustrates staggered channel allocation timing. Referring to FIGS. 1 and 3, the time slots of the forward channel allocation cycle is shown by the increments 48 *a*-48*f*, while the time slots of the reverse channel allocation cycle is shown by increments 50*a*-50*f*. The time slot intervals of the forward and reverse channels are not in phase, but rather are staggered such that the time slot intervals for channels in one direction are offset one half time slot cycle out of phase with the time slot intervals for channels in the opposite direction. During the time slot beginning at 48*a*, the base station processor 16 sends a message to the subscriber access unit 14, shown by 52. About halfway through the time slot from 48*a*-48*b*, a time slot 50*a* begins on the subscriber access unit 14, as defined by the reverse channel allocation cycle. As the base station processor 16 completes the message transmission at 48*b*, the subscriber access unit is in the middle of a time slot. The return message, however, requires only one half of a time slot interval to process and enqueue for transmission, as shown by time block 54.

As the time slot begun at 50*a* expires at 50*b*, the return message is enqueued for transmission. During the time slot from 50*b*-50*c*, the return message is sent from the subscriber access unit 14 to the base station processor 16, shown by time block 56. A similar sequence occurs at time blocks 58, 60, and 62. The return message is received by the base station processor 16 only 2.5 time slot intervals after it was sent. Therefore, the wireless channel allocated for the return message is available for other messages more quickly.

The system and method described herein is employed on both endpoints of the wireless link. Messages sent from the base station processor 16 to the subscriber access unit 14, as well as messages sent from the subscriber access unit 14 to the base station processor 16, are equally applicable to wireless channel allocation as described herein. Also, the messages described herein refer to sequences of data transmitted between a subscriber access unit and a base station processor 16 during a time slot interval. In a particular embodiment, these messages are link layer messages transmitted in accordance with the underlying wireless RF protocol. The system and methods as claimed herein, however, could be applied to other types of demand based scheduling of data transmission, such as message packets, frames, and fragments, at other layers of transmission.

Figure 4:
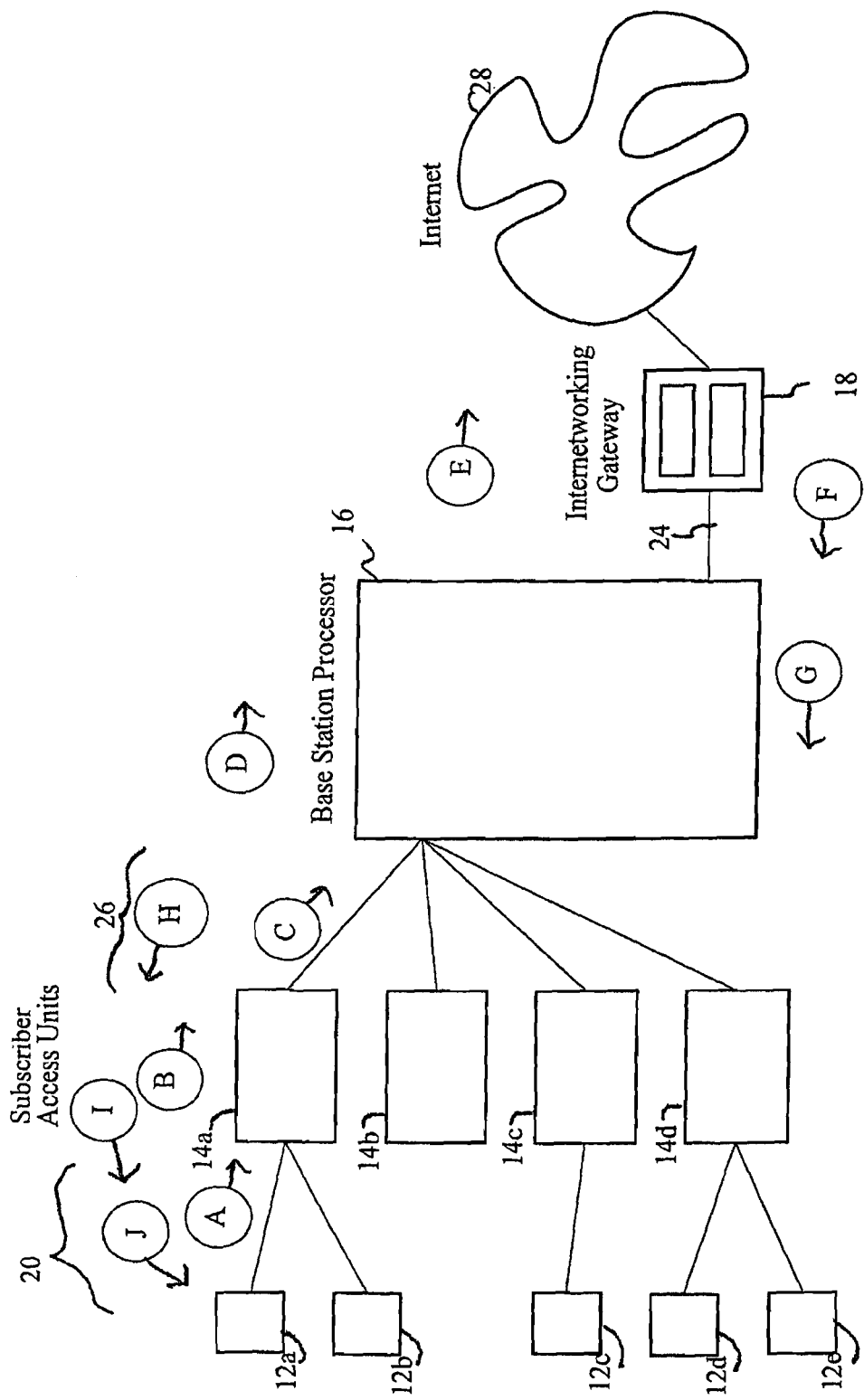
FIG. 4 shows an example of message transmission via the wireless communication system of FIG. 1.

FIG. 4 shows an example of common a web page fetch via a browser application on a user PC using staggered channel allocation. Such a web page fetch is typically in the form of packets containing data according to the Hypertext Markup Language (HTML). This type of transaction typically results in many allocations of wireless channels and wireless messages as described above, as the data is manipulated according to various protocols prior to reaching the link level. Referring to FIG. 4. a user sends a web page fetch request from user PC 14a. The message is sent via the wired link 20 to the subscriber access unit 14a as shown by arrow A. The subscriber access unit receives the message and processes it for transmission to the base station processor 16 as shown by arrow B. Transmission to the base station processor 16 occurs at C, via the wireless link 26, and includes a series of wireless messages corresponding to the channel allocation described above with respect to FIG. 3. At D the wireless messages are reassembled, and sent to an internetworking gateway 18 via wired link 24. The internetworking gateway sends the HTML fetch to a remote node via the Internet 28, shown by arrow E. Arrow F denotes the requested HTML page returned from the remote node. The base station processor 16 receives the HTML page via the wired link 24, and processes it for transmission to the subscriber access unit 14. As above, transmission to the subscriber access units occurs via wireless messages over wireless channels allocated as above as described above with respect to FIG. 3, as shown by arrow H. The subscriber access unit reassembles the wireless messages into the HTML page, as shown by arrow I, and sends the HTML page to the user PC 12a, as shown by arrow J.

The wireless channels described above typically transport messages according to a wireless protocol, and contain wireless packed framing information. By way of example, the wireless packet framing information may be that described in Patent Cooperation Treaty Application No. WO99/44341 entitled "Dynamic Frame Size Setting For Multichannel Transmission," published Sep. 2, 1999, and which is hereby incorporated by reference. In that scheme, Code Division Multiple Access (CDMA) encoding is used to define multiple logical channels on a given physical channel. For example, a long pseudo-random noise (PN) code sequence can be used to define multiple logical channels on a given radio frequency carrier signal. Other codes may be layered on the long PN code, such as error correction codes or optional short pseudo-random noise (PN) codes, to further define the channels and make them robust in noisy environments.

Figure 5:
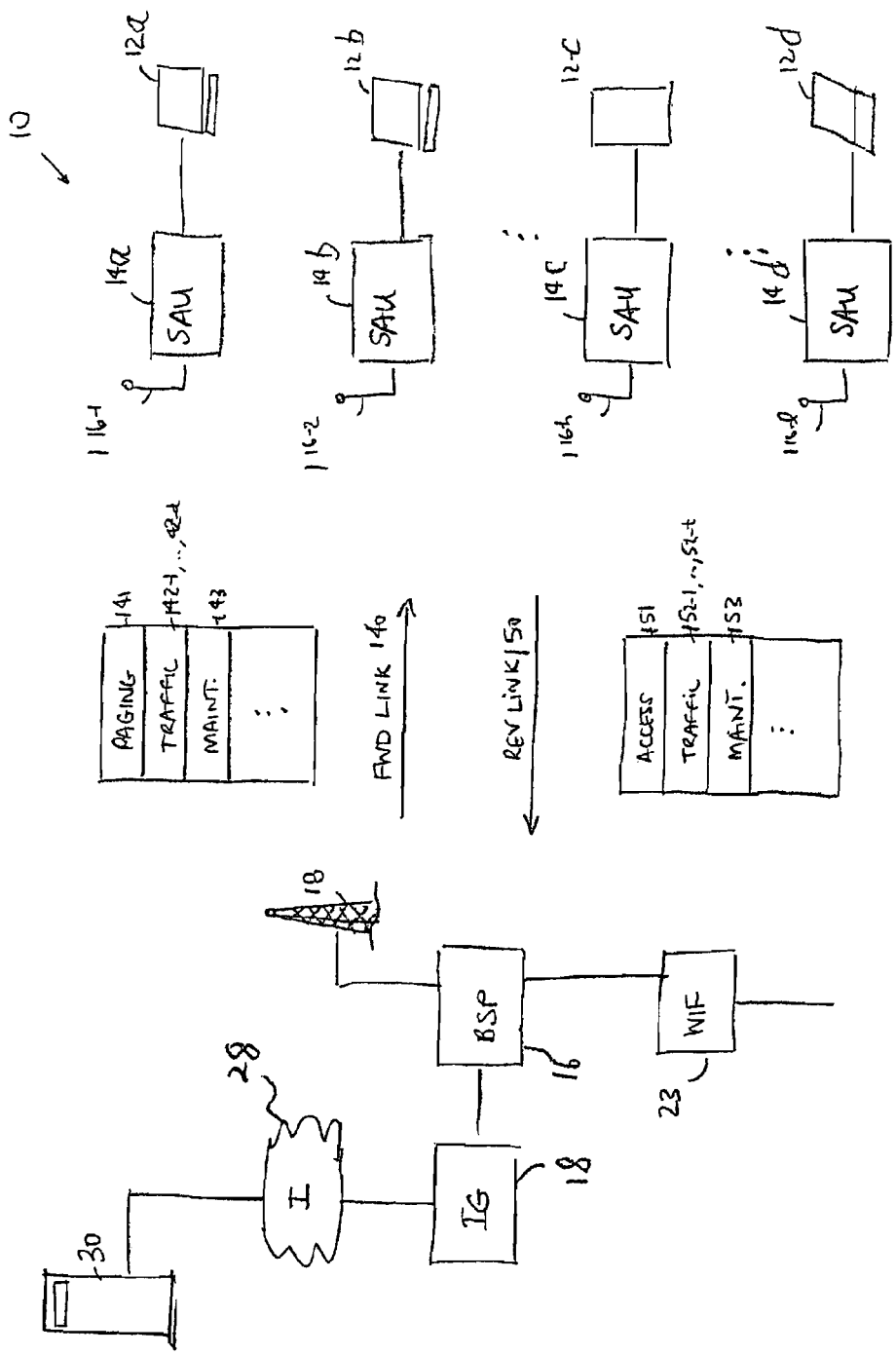
FIG. 5 shows channel allocation and scheduling in greater detail.

In accordance with the link layer or even a higher layer TCP/IP protocol, a receiving endpoint is expected to send an acknowledgment message to the corresponding sending unit upon complete and correct receipt of a packet. Referring to FIG. 5, this acknowledgment message may be sent in response in a cumulative fashion, such that a given acknowledgment message indicates that a number of consecutive packets have been received successfully. However, in any event, it can be appreciated that these acknowledgment messages in the system 10 must be sent over the forward link 140 or reverse link 150 in response to messages sent on the reverse 150 or forward 140 link, respectively. Given that the system 10 is a wireless system, radio resources must therefore be provisioned for sending such acknowledgment messages regardless of the exact physical layer configuration.

The channels comprising the forward and reverse links will now be discussed in greater detail. In a particular embodiment, the reverse link 150 actually consists of a number of different types of logical and/or physical radio channels including an access channel 151, multiple traffic channels 152-1, ... 152-t, and a maintenance channel 153. The reverse link access channel 151 is used by the subscriber access units 14 to send messages to request that traffic channels be granted to them. The assigned traffic channels 152 then carry payload data from the subscriber access unit 14 to the base station processor 16. It should be understood that a given IP level connection may actually have more than one traffic channel 152 assigned to it as described in the previously referenced patent application. In addition, a maintenance channel 153 may carry information such as synchronization and power control messages to further support transmission of information over the reverse link 150.

Similarly, the forward link 140 typically includes a logical paging channel 141 that is used by the base station processor 16 to not only inform the subscriber access unit 14 that forward link traffic channels 152 have been allocated to it, but also to inform the subscriber access unit 14 of allocated traffic channels 152 in the reverse link direction. Traffic channels 142-1 ... 142-t on the forward link 140 are used to carry payload information from the base station processor 16 to the subscriber access units 14. Additionally, maintenance channels carry synchronization and power control information on the forward link 140 from the base station processor 16 to the subscriber access units 14.

Additional information as to one possible way to implement the various logical channels 141, 142, 143, 151, 152, and 153 is also provided in Patent Cooperation Treaty Application No. WO99/63682 entitled "Fast Acquisition Of Traffic Channels For A Highly Variable Data Rate," published Dec. 9, 1999.

Figure 6:
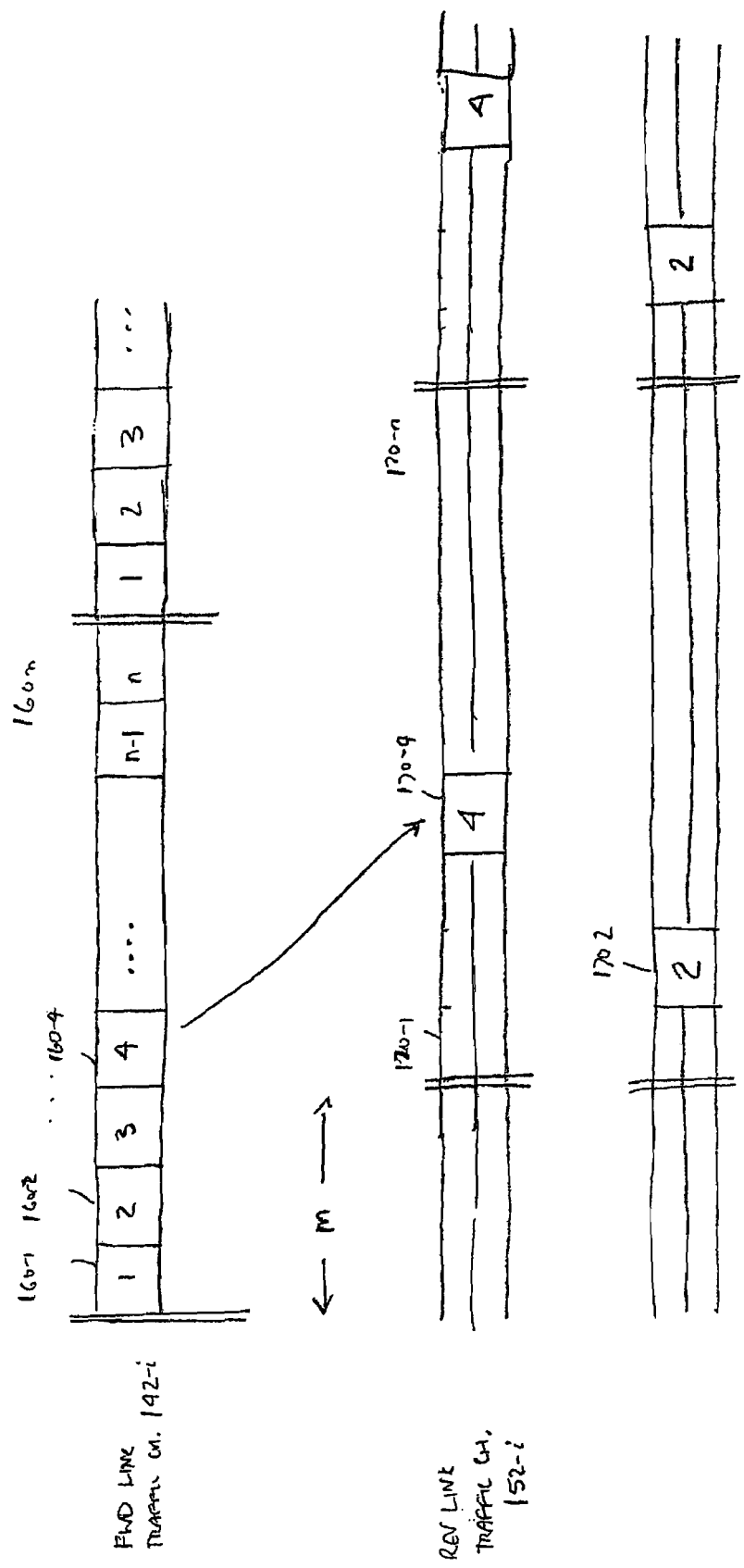
FIG. 6 shows a timing diagram of scheduling a reverse channel.

As shown more particularly in FIG. 6, a typical forward link traffic channel 142 is partitioned into a pre-determined number of periodically repeating time slots 160-1, 160-2, ... 160-n for transmission of messages to the multiple subscriber access units 14. A given subscriber access unit 14 identifies messages directed to itself based upon when a message is received in an assigned time slot 160. It should be understood that a given subscriber access unit 14 may at any instant in time have multiple ones of the time slots 160 assigned to it or at other times may have no time slots assigned to it. The assignment of time slots 160 is communicated from a central controller such as a wireless Internet facility base station controller 23 or the base station processor 16 itself over the paging channel 141. The allocation of radio and traffic channels occurs on a demand basis among the various subscriber access units 14 in a physical area serviced by the system 10.

The manner of assignment of the time slots and radio channels is not of importance to the present invention; rather the present invention is more concerned with a particular embodiment in which a time slot 160 is scheduled in a staggered interval and assigned to the reverse link 150 following reception of a valid message on the forward link 40.

In particular, the reverse link traffic channels 152 are shared among the multiple subscriber access units 14. For example, a given reverse link traffic channel 152-*i* is partitioned into a number of time slots 170-1 ... 170-*n* in a manner similar to the way in which the forward link traffic channel 142-*i* is partitioned.

Consider that a given forward link traffic channel 142-*i* may include a particular time slot 160-4. This time slot 160-4 carries packet data from the base station processor 16 to an intended subscriber access unit 14. However, unlike prior art systems, there is no specific assignment needed of reverse link traffic channel slots by sending paging channel messages to inform the connection associated with the particular time slot 160-4. Rather, upon receiving the data packet in time slot 160-4, the subscriber access unit 14 determines whether the data has been properly received such as by performing error check processing. If the packet is indicated as having been received properly, the subscriber access unit 14 makes an assumption that the acknowledgment message will be expected to be transmitted in corresponding time slot 170-4 on the reverse link traffic channel 152-*i*.

The time slot 170-4 is positioned timewise a given number of time slots, m, away from the time slot 160-4 allocated to the forward link. This, in effect, results in automatic reservation of a reverse link time slot for the acknowledgment message a fixed number of time slots, m, in the future.

Similarly, an acknowledgment message for a packet sent in time slot 160-2 is acknowledged in the time slot 170-2. The time slot 170-2 remains the m time slots away from its associated forward link time slot 160-2.

Several advantages result from this arrangement. In particular, no control signaling is required on the paging channel 141 to allocate reverse link time slots for the acknowledgment messages. The technique efficiently uses the reverse channel for acknowledgment messages such as TCP/IP layer ARQ messages among a large number of subscriber access units 14. The short time delay duration for these acknowledgment messages in turn increases the effective utilization of the traffic channels 152 on the reverse link, as well as the paging channel 141 on the forward link 140.

It should be understood that the time slot 170-4 can also carry other short messages, such as link layer acknowledgment messages. In many applications, link layer acknowledgments must be handled rapidly, and the invention provides this capability.

At higher protocol levels, the reverse time slot can be used for sending embedded links in a Web page, as described above with respect to FIG. 4. For example, a typical Hypertext Transfer Protocol (HTTP) Web page file has several embedded links which are requests to fetch other files. These embedded links can be sent back on the reverse channel using the time slots 170-4.

Those skilled in the art should readily appreciate that the programs defining the operations and methods defined herein are deliverable to a subscriber access unit and to a base station processor in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for staggered wireless channel allocation have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A code division multiple access (CDMA) wireless subscriber unit comprising:
   a circuit configured to use a pseudo-random noise (PN) code combined with other codes to define a plurality of channels on a given radio frequency carrier; and
   a circuit configured to receive a downlink communication in at least one downlink time slot; wherein in response to the received downlink communication, the circuit is further configured to produce an acknowledgement message; wherein the subscriber unit is configured to transmit the acknowledgement message in an uplink time slot a fixed integer number of uplink time slots after reception of the received downlink communication; wherein the uplink and downlink time slots are staggered by substantially a half of a time slot.

2. The CDMA wireless subscriber unit of claim 1 wherein the downlink communication includes TCP/IP data.

3. The CDMA wireless subscriber unit of claim 1 wherein the acknowledgement is a link layer acknowledgement.

4. A method for use by a code division multiple access (CDMA) wireless subscriber unit comprising:
   using a pseudo-random noise (PN) code combined with other codes to define a plurality of channels on a given radio frequency carrier;
   receiving, by the CDMA wireless subscriber unit, a downlink communication in at least one downlink time slot;
   in response to the received downlink communication, producing, by the CDMA wireless subscriber unit, an acknowledgement message;
   transmitting, by the CDMA wireless subscriber unit, the acknowledgement message in an uplink time slot a fixed integer number of uplink time slots after reception of the received downlink communication; wherein the uplink and downlink time slots are staggered by substantially a half of a time slot.

5. The method of claim 4 wherein the downlink communication includes TCP/IP data.

6. The method of claim 4 wherein the acknowledgement is a link layer acknowledgement.

7. A code division multiple access (CDMA) network device comprising:
   a circuit configured to use a pseudo-random noise (PN) code combined with other codes to define a plurality of channels on a given radio frequency carrier; and
   a circuit configured to transmit a downlink communication in at least one downlink time slot; wherein in response to the transmitted downlink communication, the circuit is further configured to receive an acknowledgement message in an uplink time slot a fixed integer number of uplink time slots after transmission of the transmitted downlink communication; wherein the uplink and down time slots are staggered by substantially a half of a time slot.

8. The CDMA network device of claim 7 wherein the downlink communication includes TCP/IP data.

9. The CDMA network device of claim 7 wherein the acknowledgement is a link layer acknowledgement.

10. The circuit of claim 1, wherein the uplink time slot is not assigned to the subscriber unit by a network device.

11. The method of claim 4, wherein the uplink time slot is not assigned to the wireless subscriber unit by a network device.

12. The network device of claim 7, wherein the uplink time slot is not assigned by the network device.

* * * * *